April 15, 1941.                J. MOHR ET AL                2,238,367
METHOD OF TREATING WASTE MATERIAL
Filed March 18, 1938
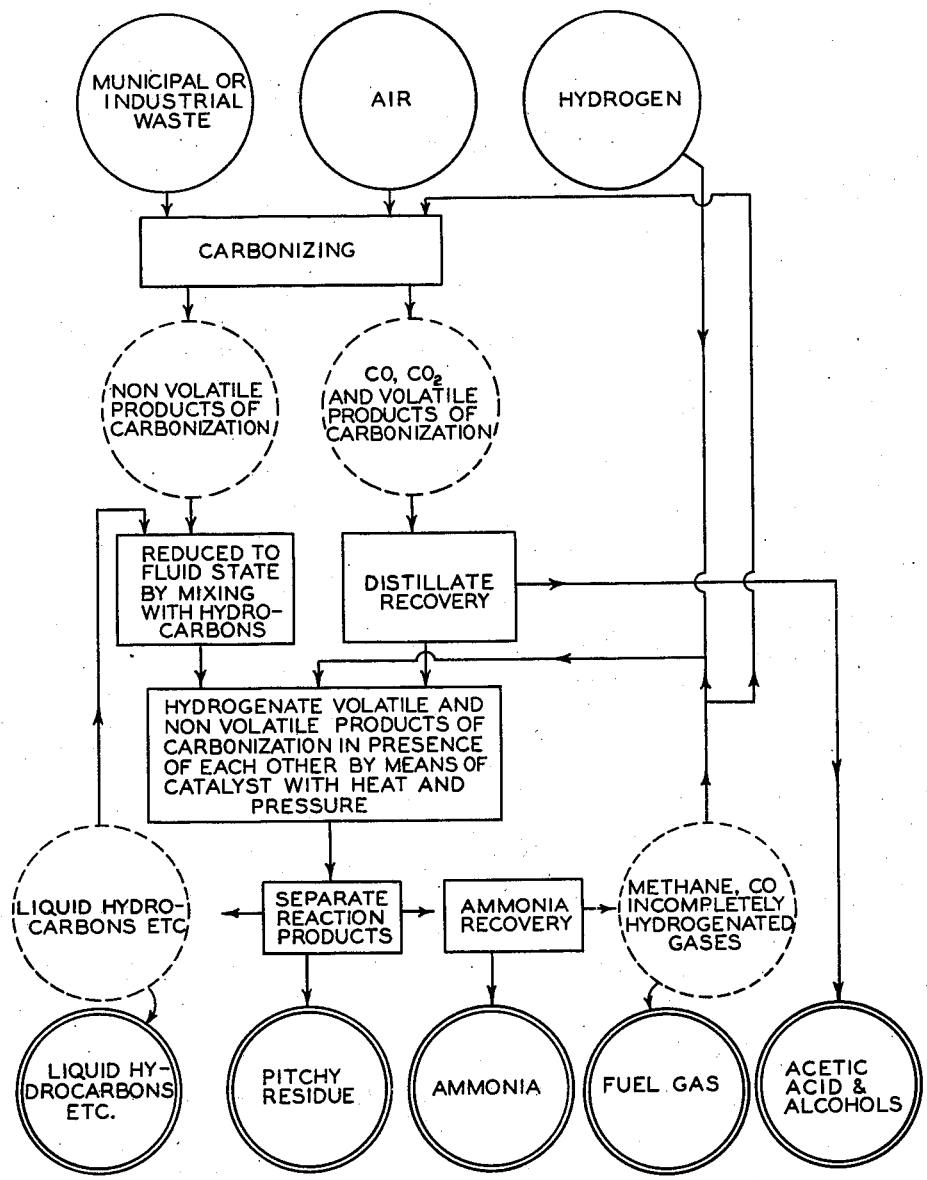
INVENTOR
JOHN MOHR.
BY ERNEST LAGELBAUER.
ATTORNEY Patented Apr. 15, 1941

2,238,367

UNITED STATES PATENT OFFICE 2,238,367

METHOD OF TREATING WASTE MATERIAL

John Mohr and Ernest Lagelbauer, New York, N. Y.

Application March 18, 1938, Serial No. 196,626

6 Claims. (Cl. 202—15)

Our invention relates to the treatment of carbon bearing materials such as municipal and industrial wastes to dispose thereof and to produce valuable by-products therefrom and particularly to methods wherein such materials are subjected to a hydrogenation treatment. This application is a continuation-in-part of our copending application Serial No. 83,962 filed June 6, 1936.

The disposal of municipal and industrial wastes presents very serious problems particularly in large cities and metropolitan areas where the quantities of material to be disposed of are great. In such locations the number and size of dumps available is limited and they are necessarily so remote from the points of collection that the cost of carting the material is frequently prohibitive. Moreover, the sanitation problems presented by dumps even in remote areas are extremely serious. On the other hand, the use of incinerators is unsatisfactory because they only reduce the bulk of the material by about one half and the fumes, smoke and cinders produced in burning waste materials as well as the cost of operations of incinerators renders them objectionable as a means for disposing of large quantities of waste materials. Furthermore it is obvious that the destruction of organic material without the recovery of by-products is economically unsound.

It has been proposed heretofore to treat relatively pure carbon or carbon bearing substances such as coal, tar and oil bearing shales with hydrogen to produce various hydrocarbons but such methods of operation have not been applicable to the treatment of material such as garbage and trash, sewage sludges, and many types of industrial waste which are composed almost entirely of uncarbonized substances and which vary greatly in composition. Moreover, in those instances wherein carbonization residues have been subjected to hydrogenation operations heretofore the carbonizing and hydrogenation operations have been so completely separated that gases such as carbon monoxide and other products of the carbonization treatment have not been utilized in the hydrogenation treatment.

We have discovered that very distinct advantages are attained by the use of combined carbonization and hydrogenation operations and that by thus combining the operations so that the volatile and non-volatile products of carbonization are hydrogenated in the presence of each other and reactions take place between the carbon monoxide and the hydrogenated and incompletely hydrogenated carbonization products whereby a wide range of substances may be treated without material change in the operating conditions and the yield and value of the reaction products obtained in a given length of time of treatment is increased.

These characteristics and advantages of our invention render it particularly applicable to the treatment of waste material such as garbage and trash, sewage sludges, industrial wastes and many other materials which heretofore have presented difficult and expensive problems of disposal. Moreover in accordance with our invention the bulk of the material treated is reduced far below that of material which is simply burned whereas the valuable by-products obtained reduce the cost of operation and in some instances may render the operation profitable in itself.

These results are accomplished by first subjecting the material to a carbonization treatment in which a part of the material may undergo incomplete oxidation and carbon monoxide is produced. Both the volatile and non-volatile products obtained thereby including the gaseous products such as carbon monoxide as well as solids and distillates are then subjected directly to a hydrogenation treatment by applying heat and pressure thereto in the presence of a hydrogenation catalyst and in the presence of each other. In some instances certain of the condensible products of the carbonization treatment may be eliminated before hydrogenation but substantial amounts or all of the carbon monoxide produced enter into the hydrogenation reaction whereby they react with the other products undergoing treatment and higher yields of by-products and more valuable substances are recovered from the reaction than can be obtained when the starting material is relatively pure carbon or is largely composed of carbonized solids, tars or liquid substances. Moreover methane and other gaseous products resulting from the hydrogenation of carbon monoxide may be used as a source of heat carbonizing the material thus reducing the cost of the operation and increasing the yield of valuable by-products.

One of the objects of our invention is to provide a novel method for the treatment of carbon bearing wastes whereby the bulk thereof is greatly reduced and valuable by-products are obtained therefrom.

Another object of our invention is to provide a method for the treatment of waste materials wherein the materials are carbonized and hydrogenated in such an interrelated manner as to produce a high yield of valuable by-products.

A further object of our invention is to provide an improved method for the disposal of municipal and industrial wastes and similar products wherein substantially all of the volatile and non-volatile products produced in carbonizing the materials are subjected directly to hydrogenation treatments in the presence of a hydrogen catalyst and in the presence of each other to yield valuable reaction products.

These and other objects and features of our invention will appear from the following description thereof in which typical examples are cited to illustrate the invention but without intending to limit the scope thereof.

In carrying out our invention the material to be treated is first carbonized by subjecting it to an elevated temperature, in the absence of sufficient air for complete combustion thereof. The temperature at which carbonization is effected preferably is above about 200° C. particularly when carbonization is effected by heating the material in the presence of sufficient air or oxygen to generate the heat required for carbonization. Under such conditions those portions of the material actually undergoing combustion are, of course, heated to higher temperature than the remainder of the reaction mass but the temperature of all parts of the mass should be raised to above 150° C. and preferably is carried to about 350° C. to 400° C. Under such conditions the amount of carbon monoxide produced is high, due to the reduction of carbon dioxide in the course of the reaction. Furthermore any sulfur or hydrogen sulfide present or produced during carbonization is converted to sulfur dioxide so that poisoning of the catalysts thereby is avoided or reduced. If the material being treated is moist or moisture or steam is introduced during the carbonization treatment free hydrogen may be produced and the action promoted by carrying the carbonizing treatment to higher temperatures.

If the material is heated in the presence of little or no air or oxygen, as when heated in a closed chamber by means of external heat or internal electrical resistance, the length of time required to carbonize the material depends upon the temperature but is usually greater than when the material is partially oxidized and large amounts of carbon monoxide are produced. However, the amount of readily condensible distillates such as acetic acid and alcohols entering into the hydrogenation reaction or separable before hydrogenation is usually higher. The value of the reaction products obtained under such conditions is usually greater than when large amounts of carbon monoxide are produced.

The reaction products of the carbonization treatment some of which are volatile and others non-volatile are subjected directly to a hydrogenation reaction with or without the separation of constituents thereof. Generally the yield of cyclic hydrocarbons derived, presumably, from the hydrogenation of pyroligneous acids and lignin derivates is higher and the value of the by-products obtained greater when no separation of constituents from the carbonization treatment is made.

The hydrogenation treatment may be carried out in any desired way using a suitable catalyst and preferably at temperatures above about 150° C. and under a pressure of from about 2 to 50 atmospheres. During the course of the reaction the volatile and non-volatile products of carbonization are treated in the presence of each other. The carbon monoxide present and to a lesser extent any carbon dioxide in the volatile carbonization products are believed to play an important part in the formation of substitution products of higher molecular weight and greater value than are the products normally obtained in hydrogenation treatments. The temperature at which the hydrogenation reaction is carried out depends on the catalyst used, the nature of the reaction products sought and on other factors. In some instances this temperature is no higher than that to which the material is subjected during carbonization while in other instances it is considerably higher. Generally the temperatures used when employing a nickel catalyst are from 150° C. to 400° C. but when employing other catalysts the hydrogenation treatment may be carried out at higher temperatures and up to about 1000° C.

Among the various catalysts that may be employed are finely divided metals such as nickel, iron, copper, chromium, tungsten, and molybdenum as well as various alloys of these metals. The oxides of metals such as nickel oxide, iron oxide ($Fe_2O_3$), copper oxide, as well as various other compounds and substances generally known to function as hydrogenation catalysts may be used.

However, the choice of the catalyst to be employed and the temperature of the hydrogenation treatment will vary considerably and may be chosen to produce a high yield of those by-products most desired. Moreover, the form of the catalyst and the manner in which it is employed can be varied considerably. Thus the catalyst may be added to the products of carbonization in the form of a finely divided powder or it may be applied as a coating to refractory or other surfaces in the reaction chamber.

The length of time required for the hydrogenation of the various constituents of the material depends upon the amount of agitation employed as well as the catalyst used and the temperature at which the reaction is carried out.

The sequence of process steps and the interrelation thereof will be apparent from the flow sheet of the accompanying drawing wherein materials supplied to the operation are indicated in single circles, the process steps are indicated in rectangles, the intermediate reaction products are indicated in dotted circles and the products recovered are indicated in double circles.

In order to illustrate methods of operation in accordance with our invention as applied to representative carbon containing waste materials, the following examples are cited, it being understood however that the conditions of operation and the nature of the resulting by-products will vary considerably from those herein cited in applying our invention to other materials than those referred to in the examples.

*Example 1*

1,000 lbs. of garbage and trash from a typical municipal collection and having a composition of approximately 65% cellulose, 20% starches and sugars, 8% protein and 7% inert material is heated for a period of about 2 hours to from 200° C. to 400° C., by partial combustion of a portion of the material with a limited amount of air, when the material will have been reduced in weight to about one quarter of its original weight. During the initial stages of the operation the gaseous products of combustion and distillation, directly as produced and while carbonization of the remaining materials continues, are mixed with an amount of hydrogen which varies with the composition of the combustion products and therefore varies as the reaction proceeds and the more stable constituents of the mass are carbonized. The amount of hydrogen is controlled to avoid an excess thereof and is usually less during the initial stages of the carbonization when pyroligneous acids and alcohols are being driven off than during the later stages when large amounts of carbon monoxide are produced.

The gases and vapors after being mixed with the hydrogen are passed through a hydrogenation chamber under a pressure of about 35 atmospheres and at a temperature of about 400° C. Within the chamber the gases are caused to flow rapidly and in a turbulent manner over a catalyst in the form of finely divided nickel. The rate of flow and length of travel of the gases and vapors is preferably such that they remain in the chamber in contact with the catalyst for a period of about 6 minutes.

The products leaving the chamber include condensible hydrocarbons, alcohols and cyclic organic compounds which are separated from gases such as methane, ethane and highly volatile hydrocarbons produced by the reaction. These gases are largely returned to the reaction by introduction with the hydrogen and products of combustion passing to the hydrogenation chamber. However a portion of the gases are used as fuel to raise the temperature of the material being carbonized.

As the carbonization continues and the amount of the remaining material is reduced the resulting pasty mass of non-volatile carbonization products is mixed with liquid hydrocarbons recovered from the hydrogenation reaction until reduced to a fluid state and then is introduced into the hydrogenation chamber with hydrogen and the recycled gases which consist largely of carbon monoxide, methane and unreacted or partially reacted volatile products of carbonization. The mixture is agitated vigorously and allowed to remain in the chamber and in the presence of the hydrogenation catalyst and the volatile products of carbonization for a period of about 12 minutes during the course of which time the bulk of the material is further reduced and the hydrocarbons with which it was mixed and to which its constituents are converted are carried off leaving an unreacted residue of inert material and pitchy substances equal to less than 10% of the weight of the original material.

The final reaction products obtained include nearly 200 lbs. of distillates, the remainder being gaseous hydrocarbons and carbon monoxide adapted for use as fuel. The distillate consists largely of light aliphatic hydrocarbons and alcohols but approximately 35 to 40 lbs. of aromatic compounds including benzene, phenols and substitution products are recovered. The unreacted residue is capable of use in road building but may be discarded as waste and is not in a form which presents sanitation problems on disposal. Moreover, it is so reduced in bulk that the by-products recovered pay for the cost of its removal and in some cases a profit is obtained.

Example 2

The process of Example 1 may be carried out as a continuous operation supplying the ground material for carbonization and withdrawing the reaction products as rapidly as the equipment employed may be operated.

For this purpose the amount of hydrogen introduced with the gases undergoing hydrogenation is established as an average for the conditions presented. The solids from the carbonization treatment are treated separately from the gaseous products but the gases produced during hydrogenation of the gaseous products and consisting largely of methane and carbon monoxide are introduced into the chamber in which hydrogenation of the solid products of carbonization takes place to further the hydrogenation of the solids. The yield of products is not altered by this procedure.

Example 3

If the method of Example 1 or 2 is carried out as described but the temperature of the hydrogenation reaction reduced, to say 220° C., the amount of condensible products obtained is reduced and may not exceed 10 or 15% of the weight of the original material however the yield of methane is increased so that large amounts of gases suitable for use as fuel are produced.

Example 4

If the catalyst used in the process of Examples 1 and 2 is a mixture of iron and iron oxide and the hydrogenation treatment is carried out at a pressure of 45 atmospheres and a temperature of 300° C. a high yield of combustible gases is obtained and from 14 to 18% of condensible products, mostly light hydrocarbons are recovered.

Example 5

The gaseous products from the carbonization treatment of Example 1 are first subjected to the action of hydrogen in the presence of a finely divided nickel catalyst and at 250° C. and a pressure of 35 atmospheres for a period of about 6 minutes and then are passed rapidly over a catalyst of electrolytically deposited copper, silver or platinum on an extended porous carrier. The latter catalyst is heated to a higher temperature, say 900 to 950° C. and the reacting gases and vapors are allowed to remain in contact therewith only momentarily, say a few seconds.

The reaction products thus obtained are nearly half aromatic compounds, mostly benzine whereas about one fourth are light aliphatic hydrocarbons, the remainder being gases such as methane and carbon monoxide which are returned to the cycle with the hydrogen introduced with the solid products of carbonization.

Example 6

The method of Example 5 if carried out at a pressure of only 5 atmospheres is still operative to produce a high yield of aromatic products, up to 30 percent of the weight of the material treated, but the yield of light aliphatic hydrocarbons is reduced to about 8 percent of the material treated. The amount of methane and carbon monoxide available for heating purposes or for return to the cycle is higher than in Example 5 and will exceed 20% by weight of the material treated.

Example 7

Material such as sewage sludge having composition of approximately 32% cellulose, 28% sugars, starches and fats and 35% proteins with only about 5% of inert substances is treated as described in Example 1. The resulting reaction products are largely methane, up to 70% by weight, but about 10 to 15% of condensible hydrocarbons are produced. Of these hydrocarbons about 2 to 3% are benzine or other cyclic products. However a high yield of ammonia is produced, up to 10%, and the unreacted residue remaining after the reaction is low.

Example 8

A material high in cellulose and composed of approximately 83% cellulose, 6% sugars and starches, 3% proteins and 8% inert substances when treated in accordance with Example 1 or 2 gives a yield of approximately 30% condensible substances of which about 7% are aromatic hydrocarbons and the remainder light aliphatic hydrocarbons and alcohols. Nearly 60% of the material is converted to combustible gases, mostly methane whereas a residue of unreacted material equal to about 10% of the weight of the original material remains.

From the foregoing examples of practice in accordance with our invention it will be apparent that the products of carbonization and particularly the carbon monoxide play an important part in the reactions which serve to hydrogenate non-volatile products of carbonization and serve to produce a relatively high yield of valuable reaction products. Further it will appear from a comparison of Examples 1, 7 and 8 above that while the composition of the material treated may vary greatly the process is equally applicable thereto. This is of particular importance in the treatment of municipal wastes, the composition of which cannot be controlled effectively, and which vary from day to day and usually even from hour to hour.

In carrying out our invention any suitable type of apparatus may be employed. It is also possible to use other hydrogenation catalysts such as finely divided copper, zinc, tin or their oxides; the choice of catalyst in each case controlling the operating conditions and the reaction products obtained as well established in hydrogenation reactions. For these reasons it is not intended that our invention should be limited to the use of the particular catalysts mentioned in the examples cited or to the particular operating conditions therein described. It should therefore be understood that our invention is capable of wide variation and application and that the examples cited are intended to be illustrative of our invention and are not intended to limit the scope thereof.

We claim:

1. In the treatment of municipal and industrial wastes containing carbon bearing material for the purpose of producing valuable products therefrom, the process steps of carbonizing said material by heating the same in the presence of air or oxygen in an amount insufficient to effect complete combustion thereof whereby volatile and non-volatile products of carbonization including carbon monoxide are formed and simultaneously hydrogenating the volatile and non-volatile products of carbonization under conditions tending to cause reactions to take place between the same by subjecting said products to the action of hydrogen and the influence of heat and pressure in the presence of each other and in the presence of a hydrogenation catalyst which is active under the conditions of heat and pressure employed.

2. In the treatment of municipal and industrial wastes containing carbon bearing materials for the purpose of producing valuable products therefrom, the process steps of carbonizing said material, whereby volatile and non-volatile carbonization products are formed, producing a mixture of both the volatile and the non-volatile products of carbonization with hydrogen and causing the constituents of said mixture to react with the hydrogen and with each other by subjecting the mixture to contact with a hydrogenation catalyst and to the influence of heat and pressure.

3. In a process for the treatment of carbon containing waste material to produce valuable products therefrom, the steps comprising carbonizing the material by heating the same in the presence of air or oxygen in an amount insufficient to effect complete combustion thereof whereby non-volatile products and substantial amounts of carbon monoxide are produced and simultaneously hydrogenating both the non-volatile products and the carbon monoxide in the presence of each other by subjecting them while in the same reaction zone to the action of hydrogen and to the influence of heat and pressure in the presence of a hydrogenation catalyst which is active under the conditions of heat and pressure employed.

4. A method for the treatment of carbon bearing materials which comprises the steps of carbonizing said material by heating the same in the presence of air or oxygen in an amount insufficient to effect complete combustion thereof, separating volatile products from non-volatile products of the reaction, mixing the non-volatile products with a hydrocarbon and thereafter simultaneously hydrogenating the volatile constituents and said mixture in the presence of each other to produce reactions between the same by subjecting both said volatile products and said mixture to the action of hydrogen and to the influence of heat and pressure in the same reaction zone and while in the presence of a hydrogenation catalyst which is active under the conditions of heat and pressure employed.

5. In a method for the treatment of garbage and trash from municipal collections to recover valuable products therefrom, the process steps of carbonizing said material, subjecting substantially all of the products of carbonization directly as produced and in the presence of each other to a hydrogenation treatment and separating condensible constituents from the resulting reaction products.

6. In a method for the treatment of garbage and trash from municipal collections to recover valuable products therefrom, the process steps of carbonizing said material and subjecting volatile and non-volatile products of the carbonization treatment simultaneously to the action of hydrogen and to the influence of heat and pressure in the presence of a hydrogenation catalyst and in the presence of each other.

JOHN MOHR.
ERNEST LAGELBAUER.